United States Patent [19]

Schmidt et al.

[11] 4,271,274
[45] Jun. 2, 1981

[54] FLAMEPROOFED POLYESTERS OF IMPROVED VISCOSITY

[75] Inventors: Werner Schmidt, St. Augustin; Rüdiger Minke, Troisdorf, both of Fed. Rep. of Germany

[73] Assignee: Dynamit Nobel Aktiengesellschaft, Troisdorf, Fed. Rep. of Germany

[21] Appl. No.: 39,034

[22] Filed: May 14, 1979

[30] Foreign Application Priority Data

May 16, 1978 [DE] Fed. Rep. of Germany ....... 2821292

[51] Int. Cl.³ .............................................. C08L 63/00
[52] U.S. Cl. ................................ 525/111; 260/90 R; 260/457 SB; 525/109; 525/438
[58] Field of Search ........................ 525/438, 109, 111

[56] References Cited

U.S. PATENT DOCUMENTS

| | | | |
|---|---|---|---|
| 3,909,485 | 9/1975 | Hongo | 525/438 |
| 3,965,212 | 6/1976 | Kamada | 525/438 |
| 4,010,219 | 3/1977 | Aoyama | 525/438 |
| 4,035,333 | 7/1977 | Kamada | 525/438 |
| 4,101,601 | 7/1978 | Thomas | 525/438 |

*Primary Examiner*—Paul Lieberman
*Attorney, Agent, or Firm*—Sprung, Felfe, Horn, Lynch & Kramer

[57] ABSTRACT

A composition comprising a polyester, a brominated flameproofing agent for said polyester and 0.5–20 weight percent, preferably 1–8 weight percent, of an epoxy resin; a process for improving the decomposition behavior of a polyester composition containing a brominated flameproofing agent which comprises adding to said composition an epoxy resin an amount of 0.5 to 20 weight percent.

17 Claims, No Drawings

FLAMEPROOFED POLYESTERS OF IMPROVED VISCOSITY

BACKGROUND OF THE INVENTION

1. Field of the Invention

This invention relates to polyester compositions containing a brominated flameproofing agent. More especially, this invention relates to an improved polyester composition containing a brominated flameproofing agent wherein the composition contains an epoxy resin. In accordance with the invention, there has been the discovery that by the use of an epoxy resin in such a composition, decomposition behavior of the composition is markedly improved. By improvement of such decomposition behavior, determined by measuring the reduced viscosity of the resultant composition in various forms, there is provided a polyester composition whose end use properties are materially improved. The polyester compositions of the invention include in particular polybutylene terephthalate (PBT) polyester compositions, especially those containing as brominated flameproofing agent a brominated poly-p-xylyleneglycol-bisacrylate, e.g., polytetrabromo-p-xylyleneglycol-bisacrylate (TBX-PA).

2. Discussion of the Prior Art

The properties of use of polyesters are directly related to their viscosity. The higher the viscosity, the better the rigidity, strength and toughness of the molded articles. In a separate postcondensation operation in the solid phase, the viscosity obtained in the polycondensation is therefore increased further with attendant improvement of the mechanical properties, which in the case of PBT is of considerable importance.

A measure of the viscosity is the so-called reduced viscosity, $\eta$ red., based on the formula $$\eta \text{ red.} = \left(\frac{\eta}{\eta_o} - 1\right) \times \frac{1}{c},$$

where $\eta_o$ is the viscosity of the solvent (60 parts by weight of phenol and 40 parts by weight of tetrachloroethane), $\eta$ is the viscosity of the solution, and c is the concentration of the solution (1 g/100 cc), measured at 25° C.

In many cases, technically polycondensed PBT, for example, will have $\eta$ red. values ranging from 0.8 to 0.9 dl/g, which can be increased by postcondensation to 2.0 dl/g and higher, depending on the end use. Commercial PBT often has $\eta$ red. values ranging from 1.3 to 1.6 dl/g. Such a PBT has good mechanical properties, including good flexural strength, impact resistance, and notch impact strength.

Reinforcements, and particularly glass fibers, are added to a large proportion of the polyesters, and especially of PBT, to increase their rigidity. Here, too, a high viscosity will improve the properties of use of injection-molded articles.

Because of the flammability of polyesters, the flameproofing of unreinforced and reinforced polyesters is of great importance. Finely divided flame-retardant additives can be thermoplastically worked into PBT and other polyester granules, optionally together with glass fibers, on a kneader or extruder, for example. This must be done at temperatures ranging from 240° to 300° C. The thermoplastic mixture is extruded into a strand, for example, and the latter is chopped into granules, from which articles are then molded on an injection-molding machine, the processing temperatures employed again ranging from 240° to 300° C.

However, the necessarily high processing temperatures result in decomposition of the polyesters with attendant reduction of the viscosity. Since the best polyesters have the highest viscosity and therefore require the highest processing temperatures, it is precisely the highest-grade polyesters which suffer the most damage through a reduction of the viscosity.

Many additives to the thermoplastic mixtures contribute to a reduction of the viscosity. For example, many lubricants and colorants, and almost all fillers and reinforcements, will intensify the reduction in viscosity. Because they lower the viscosity, the fillers added with a view to improving the properties of the material do not achieve their full effect. The reinforcing effect of glass fibers is also lessened by the reduction in viscosity.

The decomposition of polyesters sets in already during processing in the extruder and is increased by the heavier thermal stresses set up during injection molding. Now in the case of molded articles incorporating flame retardants, such decomposition is particularly deleterious and serious since many flame retardants and their synergists themselves have an adverse effect on the mechanical properties of the molded articles and the reduction in viscosity will further increase embrittlement and may in the end render the molded articles unfit for use.

The simultaneous presence of a plurality of substances promoting decomposition results in enhanced and often additive decomposition effects. Decomposition is particularly pronounced when both reinforcements such as glass fibers and flame retardants are present.

This process is totally undesired since it is directly responsible for an impairment of the properties of use of molded articles so produced. It has therefore been sought, in the case of PBT and other polyesters, to start out with as high a viscosity as possible in order to still have a sufficiently high residual viscosity, and hence adequate properties of use, in the finished molded article. However, limits are imposed on this approach by these three factors:

1. The higher the initial viscosity, the more pronounced the decomposition in thermoplastic processing.
2. Polyesters of very high viscosity are more difficult to process thermoplastically.
3. Postcondensation of polyesters up to very high viscosities reduces the economy of the process.

It has been known from German patent application DOS No. 25 01 988 to add epoxides to both reinforced and unreinforced polyesters so that when hardening and crosslinking agents, referred to as catalysts, are added at the same time in amounts of from 0.03 to 0.5% of the total mixture a lengthening of the chain of the polyester is achieved, and with it compensation for the decomposition.

However, the crosslinking agents have been found to give rise to discoloration, and occasionally embrittlement, at the high processing temperatures of the polyesters.

It has also been known to process similar polyesters incorporating epoxides with certain flame retardants in accordance with German patent application DOS No. 25 02 835, use being made of the aromatic monomeric bromine compounds decabromo diphenyl oxide, hexabromo or octabromo diphenyl together with $Sb_2O_3$.

While such monomeric flame retardants do not result in particularly pronounced decomposition of polyesters, they are not especially compatible with polyesters and will migrate from molded articles, leaving a coating. These flame retardants will volatilize quickly, especially at elevated temperatures of use, and the original flammability therefore will soon be restored.

On the other hand, polyesters incorporating flame retardants are known from German Pat. No. 25 27 803 and U.S. Pat. No. 4,128,709 whose polymeric flame retardants do not migrate and whose flame retardancy is permanently preserved even at high temperatures of use.

SUMMARY OF THE INVENTION

In accordance with the present invention it has been found that the extensive decomposition of polyesters as occasioned by processing conditions such as experienced in injection molding apparatus can be virtually completely suppressed by the addition of polyepoxides to the flameproof polyester composition. Thus, the present invention contemplates a process of improving the decomposition behavior of a polyester composition containing a brominated flameproofing agent, which process comprises adding to said composition an epoxy resin in amount of 0.5 to 20 weight percent. Preferably, the epoxy resin is added in an amount of 0.5 to 8 weight percent, e.g., 1 to 8 weight percent, based upon the weight of the total mixture.

The epoxy resin can be added to the polyester either before the brominated flameproofing agent is added thereto, together with the brominated flameproofing agent or, although less desirably, after the brominated flameproofing agent is added to the polyester. As a result, there is provided a new composition of improved physical properties, especially in respect of the composition's ability to resist decomposition when worked at high temperatures and/or pressures as are found in plastic working machines such as injection molding machines and extruders.

The composition of the present invention comprises a polyester, a brominated flameproofing agent for said polyester and 0.5 to 20 percent by weight of an epoxy resin.

Polyesters which can be employed in the composition of the invention and thus have their composition behavior improved include all known polyesters such as those obtained by the polymeric condensation of a polyhydric alcohol, e.g., dihydric alcohol especially aliphatic dihydric alcohol, and a composition containing a polycarboxylic acid function. The polycarboxylic acid function can be furnished by a di- or higher polycarboxylic acid or a di- or higher carboxylic acid halide but preferably is furnished by a di- or higher carboxylic acid ester, e.g., a $C_1$-$C_4$ alkyl ester. Of course, the present invention contemplates in particular improving the decomposition behavior of polyesters derived from terephthalic acid, terephthalyl chloride and/or terephthalic acid ester, e.g., methyl ester; and/or the isophthalic acid, acid chloride or acid ester isomers. The present invention contemplates in particular improving the decomposition behavior of polyesters derived from a phthalic acid containing function and a saturated dihydric aliphatic alcohol, e.g., ethylene glycol, butanediol-1,4,1,6-hexanediol, 1,5-pentanediol and neopentyl glycol. The invention particularly contemplates the improvement of the decomposition behavior of polybutylene terephthalate and polyethylene terephthalate as well as other commercially produced polyesters. Generally speaking, these polyesters to which the epoxy resins are added pursuant to the invention have a molecular weight between 400 and 3500, preferably between 600 and 1200, the molecular weight being determined in accordance with P. E. Slade: Polymer Molecular Weights (1973) New York by vapor pressure osmometry (Vol. 4 Part 1 p. 142) or gel permeation chromatography (Vol. 4, part 2, p. 287).

It has been quite surprisingly found that by the use of epoxy resins, both the decomposition of the polyester owing to the high processing temperatures and its decomposition owing to the presence of polymeric flame retardants can be so virtually completely suppressed, that only a slight reduction of viscosity occurs when the polyesters are processed.

Remarkably, the epoxides to be used for this purpose must be used alone and uncrosslinked, that is to say, without the addition of hardening or crosslinking agents based on diamines or polyamines, imidazoles, acid anhydrides, etc.

Thus, the invention has as its object a method of improving the decomposition behavior during thermoplastic processing of flameproofed polyesters which is characterized in that epoxy resins are added prior to processing, in amounts of from 0.5 to 20%, and preferably of from 0.5 to 8%, by weight of the total mixture, to high-melting polyesters incorporating polymeric bromine-containing flame retardants.

Surprisingly, a good viscosity, that is to say, but slight decomposition of the polyesters, is obtained just by mixing and processing of the components without hardening and crosslinking agents being added to the epoxides for the purpose of chain lengthening.

Surprisingly, too, the pronounced reduction of the viscosity due to the polymeric bromine-containing flame retardants, and in particular polymeric acrylates or methacrylates, may be prevented entirely or almost entirely by adding relatively small amounts of epoxides.

Particularly well suited for use are epoxides or epoxy resins prepared from epichlorohydrin or dichloropropanol with diols, and particularly 2,2-diphenylolpropane (bisphenol A), or glycidyl esters or cyanuric acid. The epoxides should be solids at room temperature and have mean epoxy equivalent weights of between 150 and 2500, and preferably between 200 and 1000, measured in grams of resin containing one mol of epoxide, determined according Organic Analysis, Interscience Publishers, New York (1953) Part I, Pages 127/154. Preferably, the epoxides or epoxy resins are 1,2-epoxides or epoxy resins.

Other useful epoxides or epoxy resins include: modified epoxy resins based on epoxy resins noted above and modified e.g. by polyols as glycerol or unsaturated fatty acids as more specificeatly disclosed by "Ullmanns Encylopädie der technischen Chemie" 1957, Vol. 8, pages 432 to 435.

The working in of the epoxides in accordance with the invention requires no special measures and may be effected without an additional operation. The epoxides are added together with the flame retardants, and optionally with such other additives as reinforcements or fillers, lubricants, colorants and the like, and the mixture is formed into a strand in an extruder in known manner at the usual processing temperatures of from 250° to 300° C., and the strand is then chopped into granules forming the starting material for molded articles, which may be produced conventionally on appropriate injection-molding machines. The PBT contained in them has η red. values which are at least on a par with those of formulations not incorporating flame retardants.

The amount of the epoxides should be comprised between 0.5 and not more than 20 weight percent in cases where a well-preserved viscosity is of decisive importance. However, since epoxies are effective even in small amounts, they will generally be added in amounts of from 0.5 to 8%, and preferably from 0.5 to 6%, by weight of the total mixture.

The flame retardants are bromine-containing polymers, and in particular polymeric brominated acrylates or tetrabromodiane polycarbonates. The polymeric acrylates or methacrylates are, in particular, uncrosslinked polymers based on pentahalogen(meth)acrylates or methyltetrahalogenbenzyl(meth)acrylates, or crosslinked polytetrahalogenxylylene-bis-(meth)acrylates containing over 50 weight percent bromine. See U.S. Pat. No. 4,128,709. The amount of the flame retardants may range from 2 to 20%, and preferably ranges from 5 to 17%, by weight of the total mixture. Very often a synergistically acting metal compound, preferably $Sb_2O_3$, is additionally used, in amounts of from 1 to 6%, and preferably from 2 to 5%, by weight of the total mixture.

A wide variety of reinforcements may be used, but glass fibers are highly preferred. They may be added in amounts of from 5 to about 60%, and preferably from 10 to 35%, by weight of the total mixture.

Other additives such as colorants, processing aids and lubricants, light or heat stabilizers are used in small amounts or, in many formulas, are absent.

In the examples which follow, the components are given in percent by weight of the total mixture. All components of the formula with the exception of the epoxy resins were dried immediately prior to thermoplastic processing for 16 hours at 110° C. The glass fibers were 6-mm-long short fibers, the PBT was used in the commercial granular form, and all other components were used as fine powders.

In order to more fully illustrate the nature of the invention and the manner of practicing the same, the following examples are presented:

As bromine containing polymers generally all polymeric substances are usable, wich do no migrate out of the product at working temperature of 240° to 280° C. during heating time. Therefore bromine containing substances which are not polymeric as tetrabromobisphenol A, pentabromophenol, brominatet diphenyls or diphenyl ethers are not preferred, but usable when loss by migration and deposition on the surface from vapors may be tolerated.

EXAMPLE 1

Formulations of flameproofed PBT incorporating different amounts of epoxy resin prepared from epichlorohydrin and 2,2-diphenylolpropane of a mean epoxy equivalent weight of 475 g of resin per mol of epoxide were prepared by intimately mixing the various predried components in a laboratory tumble dryer and extruding the mixture at machine temperatures of from 255° to 260° C. in a twin-screw extruder with kneader (ZDSK 28 of Werner & Pfleiderer) into a strand which then was chopped into granules. From a portion of these granules, small standard bars conforming to Deutsche Industrie Norm 53 453 were molded on an injection-molding machine with screw plasticator. (Make: Arburg.) The viscosity η red. of the PBT was measured both in the granules and in the molded articles. The flame retardant used was crosslinked polytetrabromo-p-xylyleneglycol-bisacrylate (TBX-PA). The initial viscosity of the PBT used was 1.53 dl/g. When tested in conformity with UL (Underwriters Laboratory) 94, all formulations were found to have the optimum difficultly-flammable value VO/VO (in the fresh condition and after 7 days' storage at 70° C.).

| | % PBT | % TBX-PA | % $Sb_2O_3$ | % epoxy resin | η red. of compound (dl/g) | |
|---|---|---|---|---|---|---|
| | | | | | Granules | Molded article |
| 1.1 | 85 | 10 | 4 | 1 | 1.34 | 1.21 |
| 1.2 | 84 | 10 | 4 | 2 | 1.36 | 1.33 |
| 1.3 | 83 | 10 | 4 | 3 | 1.35 | 1.36 |
| 1.4 | 82 | 10 | 4 | 4 | 1.41 | 1.42 |
| 1.5 | 81 | 10 | 4 | 5 | 1.40 | 1.41 |

For comparison, the same PBT without additives having a composition of 86% PBT, 10% TBX-PA and 4% $Sb_2O_3$ without addition of epoxides were injection-molded.

| | % PBT | % TBX-PA | % $Sb_2O_3$ | % epoxy resin | ηred. of compound (dl/g) | |
|---|---|---|---|---|---|---|
| | | | | | Granules | Molded article |
| 1.6 | 100 | 0 | 0 | 0 | 1.44 | 1.38 |
| 1.7 | 86 | 10 | 4 | 0 | 1.11 | 0.99 |

As is apparent from comparative example 1.6, the PBT was decomposed by mixing and granulation from 1.53 to 1.44 dl/g, and was further decomposed by injection molding to 1.38 dl/g.

The addition of a polymeric flame retardant in accordance with example 1.7 reduced the viscosity to 0.99 dl/g, resulting in a material practically unfit for use.

EXAMPLE 2

The same mixing formulas were used as in Example 1 except that sufficient PBT was replaced with glass fibers for the compound to have a glass-fiber content of 30%. The PBT used had an initial viscosity of η red. 1.63 dl/g. The results are presented in the table which follows.

| | % PBT | % Glass | % TBX-PA | % $Sb_2O_3$ | % Epoxy resin | η red. of compound (dl/g) | |
|---|---|---|---|---|---|---|---|
| | | | | | | Gran. | Molded art. |
| 2.1 | 55 | 30 | 10 | 4 | 1 | 1.47 | 1.13 |
| 2.2 | 54 | 30 | 10 | 4 | 2 | 1.45 | 1.16 |
| 2.3 | 53 | 30 | 10 | 4 | 3 | 1.45 | 1.30 |
| 2.4 | 52 | 30 | 10 | 4 | 4 | 1.46 | 1.36 |
| 2.5 | 51 | 30 | 10 | 4 | 5 | 1.44 | 1.36 |
| 2.6 | 70 | 30 | 0 | 0 | 0 | 1.51 | 1.35 |
| 2.7 | 56 | 30 | 10 | 4 | 0 | 1.35 | 0.98 |

EXAMPLE 3

In accordance with Example 2, formulation 2.4, a mixture was prepared in which, however, the polyacrylate of p-methyl-tetrabromobenzyl alcohol was used as flame retardant. The blank test without addition of 4% epoxy resin resulted in an η red. value of 1.32 dl/g in the granules and of 1.18 dl/g in the molded article. With the addition of 4% epoxy resin, on the other hand, the η red. values determined were 1.48 dl/g in the granules and 1.43 dl/g in the molded article.

EXAMPLE 4

The same mixtures were prepared as in Example 2, except that the epoxy resin had a mean epoxy equivalent weight of 650 g of resin per mol of epoxide. The η red. values determined corresponded to those of Example 2, allowing for measurement tolerances.

EXAMPLE 5

Example 1 was repeated; however, in place of TBX-PA (a) tetrabromodiane polycarbonate and (b) a polymer of equal parts of m- and o-pentabromobenzylmethacrylate were used in the same amount. The amounts added of said epoxide, ranging from 1 to 5 wt. %, had a corresponding effect on the viscosity.

EXAMPLE 6

Example 2.4 was repeated; however, in place of the epoxide there named an epoxide prepared from dichlorohydrin and 2,3-diphenylolpropane having an epoxy equivalent weight of 625 g of resin per mol of epoxide was used. With a 4% addition as in Example 2, the PBT decomposition (initial viscosity, η red., 1.58 dl/g) was limited to η red. 1.41 dl/g in the molded article whereas in the epoxide-free formulation the PBT viscosity in the molded article was only η red. 1.01 dl/g.

We claim:

1. A composition comprising a polyester, a brominated flameproofing agent for said polyester which is polymeric brominated acrylate and 0.5 to 20 percent by weight of an epoxy resin based on the total weight of the composition, said composition free of crosslinking agent or hardener.

2. A composition according to claim 1 containing 0.5 to 8% by weight of an epoxy resin.

3. A composition according to claim 1 wherein the epoxy resin has a mean epoxy equivalent weight of between 300 and 2000.

4. A composition according to claim 3 wherein the epoxy resin has a mean epoxy equivalent weight between 400 and 1000.

5. A composition according to claim 1 wherein said epoxy resin is obtained from condensation of epichlorohydrin with 2,2-diphenylolpropane.

6. A composition according to claim 1 wherein said epoxy resin is a condensation product of dichlorohydrin and 2,3-diphenylolpropane.

7. A composition according to claim 1 additionally containing a filler, reinforcer, colorant, lubricant and/or stavilizer.

8. A composition according to claim 1 wherein said polyester is polybutylene terephthalate.

9. A process for improving the decomposition behavior of a polyester composition containing a brominated flameproofing agent which is polymeric brominated acrylate which comprises adding to said composition an epoxy resin in an amount of 0.5 to 20 weight percent based on the total weight of the composition.

10. A process according to claim 9 wherein the epoxy resin is added in an amount of 0.5 to 8 weight percent.

11. A process according to claim 9 wherein said epoxy resin has a mean epoxy equivalent weight between 300 and 2000.

12. A process according to claim 11 wherein said epoxy resin has a mean epoxy equivalent weight between 400 and 1000.

13. A process according to claim 9 wherein the epoxy resin is added to the polyester before and/or simultaneously with addition of said bromine flameproofing agent.

14. A process according to claim 9 wherein said polyester is polybutylene terephthalate.

15. A process according to claim 9 wherein said epoxy resin is a condensation product of epichlorohydrin with 2,2-diphenylolpropane.

16. A process according to claim 9 wherein said epoxy resin is a condensation product of dichlorohydrin with 2,3-diphenylolpropane.

17. A process according to claim 9 wherein after said epoxy resin has been added to said polyester, the resultant composition is worked in an injection molding machine.

* * * * *